(12) United States Patent
Chen et al.

(10) Patent No.: US 12,037,670 B2
(45) Date of Patent: *Jul. 16, 2024

(54) NANO-TWINNED Cu—Ni ALLOY LAYER AND METHOD FOR MANUFACTURING THE SAME

(71) Applicant: NATIONAL YANG MING CHIAO TUNG UNIVERSITY, Hsinchu (TW)

(72) Inventors: Chih Chen, Hsinchu (TW); Kang-Ping Lee, Hsinchu (TW); Yu-I Chang, Zhubei (TW); Yun-Hsuan Chen, Taichung (TW)

(73) Assignee: NATIONAL YANG MING CHIAO TUNG UNIVERSITY, Hsinchu (TW)

( * ) Notice: Subject to any disclaimer, the term of this patent is extended or adjusted under 35 U.S.C. 154(b) by 92 days.

This patent is subject to a terminal disclaimer.

(21) Appl. No.: 17/708,371

(22) Filed: Mar. 30, 2022

(65) Prior Publication Data

US 2023/0220517 A1 Jul. 13, 2023

(30) Foreign Application Priority Data

Jan. 10, 2022 (TW) ................... 111100892

(51) Int. Cl.
*C22C 9/06* (2006.01)
*C22F 1/08* (2006.01)
(Continued)

(52) U.S. Cl.
CPC .................. *C22C 9/06* (2013.01); *C22F 1/08* (2013.01); *C25D 3/58* (2013.01); *C25D 5/18* (2013.01); *C25D 5/50* (2013.01)

(58) Field of Classification Search
CPC ... B32B 15/01; C22C 9/00; C22C 9/06; C22F 1/08; C25D 15/00; C25D 3/12; C25D 3/38; C25D 3/562; C25D 3/58; C25D 5/10; C25D 5/12; C25D 5/18; C25D 5/34; C25D 5/48; C25D 5/50; C25D 5/605;
(Continued)

(56) References Cited

U.S. PATENT DOCUMENTS 9,476,140 B2 * 10/2016 Chen .................. C25D 3/38
11,560,639 B2 * 1/2023 Chen .................. C25D 7/12

FOREIGN PATENT DOCUMENTS

JP         S6021398 A     2/1985
JP      2008106356 A  *  5/2008
(Continued)

OTHER PUBLICATIONS

NPL: on-line translation of JP-2019183251-A, Oct. 2019 (Year: 2019).*

(Continued)

*Primary Examiner* — Jie Yang
(74) *Attorney, Agent, or Firm* — MUNCY, GEISSLER, OLDS & LOWE, P.C.

(57) ABSTRACT

A nano-twinned Cu—Ni alloy layer is provided, wherein more than 50% in volume of the nano-twinned Cu—Ni alloy layer comprises plural twinned grains, the plural twinned grains comprise plural columnar twinned grains, and a Ni content in the nano-twinned Cu—Ni alloy layer is in a range from 0.05 at % to 20 at %. In addition, a method for manufacturing the aforesaid nano-twinned Cu—Ni alloy layer is also provided.

16 Claims, 7 Drawing Sheets

(51) Int. Cl.
      *C25D 3/58*         (2006.01)
      *C25D 5/18*         (2006.01)
      *C25D 5/50*         (2006.01)

(58) Field of Classification Search
      CPC ........ C25D 5/611; C25D 5/617; C25D 5/627; C25D 7/00; C25D 7/123
      USPC ........................................................ 420/485
      See application file for complete search history.

(56) References Cited

FOREIGN PATENT DOCUMENTS

| | | | |
|---|---|---|---|
| JP | 2016037649 A | | 3/2016 |
| JP | 2019183251 A | * | 10/2019 |
| TW | I746383 B | | 11/2021 |

OTHER PUBLICATIONS

NPL: on-line translation of JP-2008106356-A, May 2008 (Year: 2008).*

Toshiaki Tsuru, Shigeo Kobayashi, Watalu Shimokawa and Tadayoshi Inui, Electrodeposition of copper-Nickel Alloys from Ethylenediamine Bath, Bulletin of the Faculty of Engineering, Kyushu Sangyo University, Sep. 10, 1997.

Baskaran; T.S.N. Sankara Narayanan; A. Stephen, Pulsed electrodeposition of nanocrystalline Cu—Ni alloy films and evaluation of their characteristic properties, Materials Letters 60 (2006) pp. 1990-1995.

* cited by examiner

NANO-TWINNED Cu—Ni ALLOY LAYER AND METHOD FOR MANUFACTURING THE SAME

CROSS REFERENCE TO RELATED APPLICATION

This application claims the benefits of the Taiwan Patent Application Serial Number 111100892, filed on Jan. 10, 2022, the subject matter of which is incorporated herein by reference.

BACKGROUND

1. Field

The present disclosure relates to a nano-twinned Cu—Ni alloy layer and a method for manufacturing the same. More specifically, the present disclosure relates to a nano-twinned Cu—Ni alloy layer with high hardness and a method for manufacturing the same.

2. Description of Related Art

Conventionally, the mechanical property of copper can be enhanced by rolling or doping with other metal such as Ti, Ni or Zn, but the conventional method still has its disadvantage.

If the copper film comprising copper grains is enhanced by rolling, the pure copper grains may be deformed. Even though the mechanical property of the copper film can be enhanced by rolling, the resistance thereof may be increased and the thermal conductivity thereof may be decreased. In addition, the copper film doped with other metal may cause the resistance of the copper film increased. Furthermore, the strength of the twinned copper film has high strength. If the strength of the twinned copper film is enhanced by grain refining, the obtained twinned copper film may have the problem of poor thermal stability.

Therefore, it is desirable to provide a novel twinned copper layer, wherein the strength thereof can be increased and the property thereof can be maintained, so this twinned copper layer can be applied to various electronic components.

SUMMARY

An object of the present disclosure is to provide a nano-twinned Cu—Ni alloy layer, which have excellent hardness while retaining the conductive properties (high conductivity and low resistance) of the twinned copper.

In the nano-twinned Cu—Ni alloy layer of the present disclosure, more than 50% in volume of the nano-twinned Cu—Ni alloy layer comprises plural twinned grains, the plural twinned grains comprise plural columnar twinned grains, and a Ni content in the nano-twinned Cu—Ni alloy layer is in a range from 0.05 at % to 20 at %. Herein, the volume percentage of the twinned grains may be observed or measured at any section of the nano-twinned Cu—Ni alloy layer. In addition, the element content can be obtained, for example, by chemical analysis or by field emission electron probe microanalyzer (EPMA).

In addition, the present disclosure further provides a substrate comprising the aforesaid nano-twinned Cu—Ni alloy layer, which comprises: a substrate; and the aforesaid nano-twinned Cu—Ni alloy layer disposed on or embedded in the substrate.

Furthermore, the present disclosure further provides a method for manufacturing the aforesaid nano-twinned Cu—Ni alloy layer, which comprises the following steps: providing an electrodeposition device, comprising an anode, a cathode, a plating solution and a power supply, wherein the power supply is respectively connected to the cathode and the anode, and the cathode and the anode are immersed into the plating solution; and performing an electrodeposition process with the electrodeposition device to grow the aforesaid nano-twinned Cu—Ni alloy layer on a surface of the cathode, wherein the plating solution may comprise a Cu salt, an acid and a Ni salt.

In the method of the present disclosure, the nano-twinned Cu—Ni alloy layer can be formed through a simple co-electroplating process by adding an appropriate amount of the Ni salt to the plating solution. Compared with the nano-twinned Cu layer without Ni, the nano-twinned Cu—Ni alloy layer prepared by the present disclosure not only retains the twinned structure of the nano-twinned Cu layer without Ni, but also has significantly improved hardness. Thus, the nano-twinned Cu—Ni alloy layer provided by the present disclosure not only retains the high electrical conductivity and high thermal conductivity of the nano-twinned Cu layer without Ni, but also has high strength. Thus, the nano-twinned Cu—Ni alloy layer of the present disclosure can be applied to various electronic devices.

In the present disclosure, more than 50% in volume of the nano-twinned Cu—Ni alloy layer may comprise plural twinned grains. In one embodiment of the present disclosure, for example, 50% to 99%, 50% to 95%, 50% to 90%, 55% to 90%, 60% to 90% or 65% to 95% volume of the nano-twinned Cu—Ni alloy layer may comprise plural twinned grains, but the present disclosure is not limited thereto In the present disclosure, the plating solution comprises not only a Cu salt but also a Ni salt. Thus, the nano-twinned Cu—Ni alloy layer can be formed by a co-electroplating process. By adjusting the concentration of the Ni salt in the plating solution, the nano-twinned Cu—Ni alloy layer with a specific Ni content can be formed by the co-electroplating process.

In the present disclosure, a Ni content in the nano-twinned Cu—Ni alloy layer may be in a range from 0.05 at % to 20 at % with the rest being Cu. However, the present disclosure does not exclude the possibility that other trace impurity metal elements may be contained. When the nano-twinned Cu—Ni alloy layer comprises a specific amount of Ni element, the obtained nano-twinned Cu—Ni alloy layer has improved hardness. In one embodiment of the present disclosure, the Ni content may be in a ranged from, for example, 0.1 at % to 20 at %, 0.1 at % to 15 at %, 0.1 at % to 10 at %, 0.1 at % to 5 at %, 0.1 at % to 3 at % or 0.1 at % to 1 at %, but the present disclosure is not limited thereto.

In the present disclosure, the plural twinned grains in the nano-twinned Cu—Ni alloy layer may be formed by stacking plural nano-twins along a direction within ±15 degrees of a [111] crystal axis.

In one embodiment of the present disclosure, the twinned grains may comprise plural columnar twinned grains, wherein the columnar twinned grains are formed by stacking plural nano-twins along a direction within ±15 degrees of a [111] crystal axis, and an included angle between a stacking direction of at least part of the nano-twins and a thickness direction of the nano-twinned Cu—Ni alloy layer is ranged from 0 degree to 20 degrees. When the columnar twinned grains grow to the surface of the nano-twinned Cu—Ni alloy layer, 50% or more of an area of a surface of the nano-twinned Cu—Ni alloy layer may exposes the (111) surface of the nano-twins. Thus, the surface of the nano-twinned Cu—Ni alloy layer of the present disclosure may have a (111) preferred direction. In one embodiment of the present disclosure, the (111) surface of the nano-twins exposed on the surface of the nano-twinned Cu—Ni alloy layer may be, for example, 50% to 99%, 55% to 99%, 60% to 99%, 65% to 99%, 70% to 99%, 75% to 99%, 75% to 95% or 75% to 90% of the total area of the surface of the nano-twinned Cu—Ni alloy layer; but the present disclosure is not limited thereto. In one embodiment of the present disclosure, the (111) surface of the nano-twins exposed on the surface of the nano-twinned Cu—Ni alloy layer may be about 95% to 99% of the total area of the surface of the nano-twinned Cu—Ni alloy layer; but the present disclosure is not limited thereto. Herein, the preferred direction of the surface of the nano-twinned Cu—Ni alloy layer can be measured by the electron backscatter diffraction (EBSD).

In one embodiment of the present disclosure, when the twinned grains of the nano-twinned Cu—Ni alloy layer have a significant thickness and diameter ratio, for example, when the thickness is significantly greater than the diameter, the twinned grain is a columnar twinned grain.

In another embodiment of the present disclosure, the nano-twinned Cu—Ni alloy layer not only comprise the aforesaid columnar twinned grains formed by stacking plural nano-twins along a direction within ±15 degrees of the [111] crystal axis, but also may further comprise plural fine grains stacked on the columnar twinned grains, wherein nano-twins of the fine grains are stacked without a preferred direction. Herein, the stacking direction of the nano-twins of the fine grains (i.e. the twin direction) is not particularly limited, and the nano-twins exposed on the surface of the nano-twinned Cu—Ni alloy layer may not have a preferred direction. In other words, the surface of the nano-twinned Cu—Ni alloy layer does not have a preferred direction. Herein, the fine grains may not have a significant thickness and diameter ratio, and the diameter and thickness of the fine grains are also smaller. For example, the thickness or the diameter of the fine grains may be in a range from 100 nm to 500 nm.

In further another embodiment of the present disclosure, the nano-twinned Cu—Ni alloy layer not only comprise the aforesaid columnar twinned grains formed by stacking plural nano-twins along a direction within ±15 degrees of the [111] crystal axis, but also may further comprise plural oblique twinned grains stacked on the plural columnar twinned grains. Herein, the oblique twinned grains may be formed by stacking plural nano-twins along a direction within ±15 degrees of a [111] crystal axis, and an included angle between a stacking direction of at least part of the nano-twins of the oblique twinned grains and a thickness direction of the nano-twinned Cu—Ni alloy layer may be ranged from 10 degrees to 60 degrees. Since the oblique twinned grains are twinned grains that intersect the thickness direction of the nano-twinned Cu—Ni alloy layer at the aforesaid angle, the nano-twins exposed on the surface of the nano-twinned Cu—Ni alloy layer may not have a preferred direction. In other words, the surface of the nano-twinned Cu—Ni alloy layer does not have a preferred direction.

In the present disclosure, whether it is the aforesaid columnar twinned grains, fine grains or oblique twinned grains, at least part of the twinned grains may be connected to each other. For example, more than 50%, 60%, 70%, 80%, 90% or 95% of the twinned grains may be connected to each other.

In the present disclosure, the thickness of the nano-twinned Cu—Ni alloy layer may be adjusted according to the need. In one embodiment of the present disclosure, the thickness of the nano-twinned Cu—Ni alloy layer may be in a range from, for example 0.1 μm to 500 μm, 0.1 μm to 400 μm, 0.1 μm to 300 μm, 0.1 μm to 200 μm, 0.1 μm to 100 μm, 0.1 μm to 80 μm, 0.1 μm to 50 μm, 1 μm to 50 μm, 2 μm to 50 μm, 3 μm to 50 μm, 4 μm to 50 μm, 5 μm to 50 μm, 5 μm to 40 μm, 5 μm to 35 μm, 5 μm to 30 μm or 5 μm to 25 μm; but the present disclosure is not limited thereto.

In the present disclosure, the diameter of the columnar twinned grains or the oblique twinned grains may be respectively in a range from 0.1 μm to 50 μm. In one embodiment of the present disclosure, the diameter of the columnar twinned grains or the oblique twinned grains may be respectively in a range from, for example, 0.1 μm to 45 μm, 0.1 μm to 40 μm, 0.1 μm to 35 μm, 0.5 μm to 35 μm, 0.5 μm to 30 μm, 1 μm to 30 μm, 1 μm to 25 μm, 1 μm to 20 μm, 1 μm to 15 μm or 1 μm to 10 μm; but the present disclosure is not limited thereto. In the present disclosure, the diameter of the columnar twinned grains or the oblique twinned grains may be the length of the twinned grains measured at a direction substantially perpendicular to the twin direction of the twinned grains. More specifically, the diameter of the columnar twinned grains or the oblique twinned grains may be the length (for example, the maximum length) of the twinned grains measured at a direction substantially perpendicular to the lamination direction of the twins or the twin boundaries (i.e. the extension direction of the twin boundary).

In the present disclosure, the thickness of the columnar twinned grains or the oblique twinned grains may be respectively in a range from 0.1 μm to 500 μm. In one embodiment of the present disclosure, the thickness of the columnar twinned grains or the oblique twinned grains may be respectively in a range from, for example, 0.1 μm to 500 μm, 0.1 μm to 400 μm, 0.1 μm to 300 μm, 0.1 μm to 200 μm, 0.1 μm to 100 μm, 0.1 μm to 80 μm, 0.1 μm to 50 μm, 1 μm to 50 μm, 2 μm to 50 μm, 3 μm to 50 μm, 4 μm to 50 μm, 5 μm to 50 μm, 5 μm to 40 μm, 5 μm to 35 μm, 5 μm to 30 μm or 5 μm to 25 μm. In the present disclosure, the thickness of the columnar twinned grains or the oblique twinned grains may be the thicknesses of the twinned grains measured at the twin direction of the twinned grains. More specifically, the thickness of the columnar twinned grains or the oblique twinned grains may be the thicknesses (for example, maximum thicknesses) of the twinned grains measured at the lamination direction of the twins or the twin boundaries.

In the present disclosure, "the twin direction of the twinned grain" refers to the lamination direction of the twins or the twin boundaries in the twinned grains. Herein, the twin boundaries of the twinned grains may be substantially perpendicular to the lamination direction of the twins or the twin boundaries.

In the present disclosure, the included angle between the twin direction of the twinned grain and the thickness direction of the nano-twinned Cu—Ni alloy layer may be measured in a cross-section of the nano-twinned Cu—Ni alloy layer. Similarly, the features such as the thickness of the nano-twinned Cu—Ni alloy layer, and the diameter or the thickness of the twinned grains may also be measured in a cross-section of the twinned copper layer. Alternatively, the diameter or the thickness of the twinned grains may also be measured from the surface of the twinned copper layer. In the present disclosure, the measurement method is not particularly limited, and may be performed with scanning electron microscope (SEM), transmission electron microscope (TEM), focus ion beam (FIB) or other suitable measurement manners.

In the present disclosure, the nano-twinned Cu—Ni alloy layer of the present disclosure can be formed by the co-electroplating process. Herein, the cathode can be used as a substrate, and the formed nano-twinned Cu—Ni alloy layer can be disposed on or embedded in the substrate. The cathode may be a substrate with a metal layer formed thereon or a metal substrate. The substrate may be a silicon substrate, a glass substrate, a quartz substrate, a metal substrate, a plastic substrate, a print circuit board, a III-IV group substrate or a lamination substrate thereof. In addition, the substrate may have a single layer or a multi-layer structure.

In the present disclosure, the plating solution may comprise a Cu salt, an acid and a Ni salt. Examples of the Cu salt comprised in the plating solution may comprise, but are not limited to, copper sulfate, methyl sulfonic copper or a combination thereof. Examples of the acid comprised in the plating solution may comprise, but are not limited to, hydrochloric acid, sulfuric acid, methane sulfonic acid or a combination thereof. Examples of the Ni salt comprised in the plating solution may comprise, but are not limited to, nickel sulfate, methyl sulfonic nickel or a combination thereof. In addition, the plating solution may further comprise an additive, such as gelatin, surfactants, lattice modification agents or a combination thereof.

In the present disclosure, the electrodeposition process may be performed with the direct current electrodeposition, the pulse electrodeposition, or the direct current electrodeposition and the pulse electrodeposition interchangeably to form the nano-twinned Cu—Ni alloy layer.

In one embodiment of the present disclosure, the nano-twinned Cu—Ni alloy layer is formed by the direct current electrodeposition. The current density used in the direct current electrodeposition may be ranged from, for example, 0.5 ASD to 30 ASD, 1 ASD to 30 ASD, 2 ASD to 30 ASD, 2 ASD to 25 ASD, 2 ASD to 20 ASD, 2 ASD to 15 ASD or 2 ASD to 10 ASD, but the present disclosure is not limited thereto.

In another embodiment of the present disclosure, the nano-twinned Cu—Ni alloy layer is formed by the pulse electrodeposition. The forward current density for the pulse electrodeposition may be ranged from, for example, 0.5 ASD to 30 ASD, 1 ASD to 30 ASD, 2 ASD to 30 ASD, 2 ASD to 25 ASD, 2 ASD to 20 ASD, 2 ASD to 15 ASD or 2 ASD to 10 ASD; and the reverse current density for the pulse electrodeposition may be ranged from, for example, 0.1 ASD to 10 ASD, 0.1 ASD to 8 ASD, 0.1 ASD to 5 ASD, 0.1 ASD to 3 ASD, 0.3 ASD to 3 ASD or 0.3 ASD to 1 ASD; but the present disclosure is not limited thereto. When the nano-twinned Cu—Ni alloy layer is formed by the pulse electrodeposition, in one embodiment of the present disclosure, the twinned grains of the nano-twinned Cu—Ni alloy layer may further comprise columnar twinned grains. In another embodiment of the present disclosure, when the thickness of the formed nano-twinned Cu—Ni alloy layer is increased, the twinned grains of the nano-twinned Cu—Ni alloy layer not only comprises the columnar twinned grains, but also may selectively comprise fine grains, oblique twinned grains or a combination thereof stacked on the plural columnar twinned grains.

In one embodiment of the present disclosure, after forming the nano-twinned Cu—Ni alloy layer on the surface of the cathode, the nano-twinned Cu—Ni alloy layer may be optionally annealed. Thus, the hardness of the nano-twinned Cu—Ni alloy layer may further be improved. Herein, the annealing temperature may be in a range from 50° C. to 250° C. When the annealing temperature exceeds this range, the twinned structure in the nano-twinned Cu—Ni alloy layer may become less or disappear. In one embodiment of the present disclosure, the annealing temperature may be in a range from 50° C. to 250° C., 75° C. to 250° C., 75° C. to 200° C., 100° C. to 200° C., 100° C. to 175° C. or 100° C. to 150° C.; but the present disclosure is not limited thereto. In addition, in the present disclosure, the annealing time is not particularly limited and may be, for example, in a range from 30 minutes to 10 hours, 30 minutes to 8 hours, 30 minutes to 5 hours or 1 hour to 5 hours; but the present disclosure is not limited thereto.

The shape of the nano-twinned Cu—Ni alloy layer provided by the present disclosure is not particularly limited, and may be a foil, a film, a line or a bulk; but the present disclosure is not limited thereto. In addition, the nano-twinned Cu—Ni alloy layer provided by the present disclosure may have a single layer or a multi-layered structure. Furthermore, the nano-twinned Cu—Ni alloy layer provided by the present disclosure may be combined with other material to form a multi-layered composite structure.

The nano-twinned Cu—Ni alloy layer provided by the present disclosure may be applied to various electronic products, for example, a through hole or via of a three-dimensional integrated circuit (3D-IC), a pin through hole of a packaging substrate, a metal interconnect, a substrate circuit or a connector, but the present disclosure is not limited thereto.

Other novel features of the disclosure will become more apparent from the following detailed description when taken in conjunction with the accompanying drawings.

DETAILED DESCRIPTION OF EMBODIMENT

Figure 1:
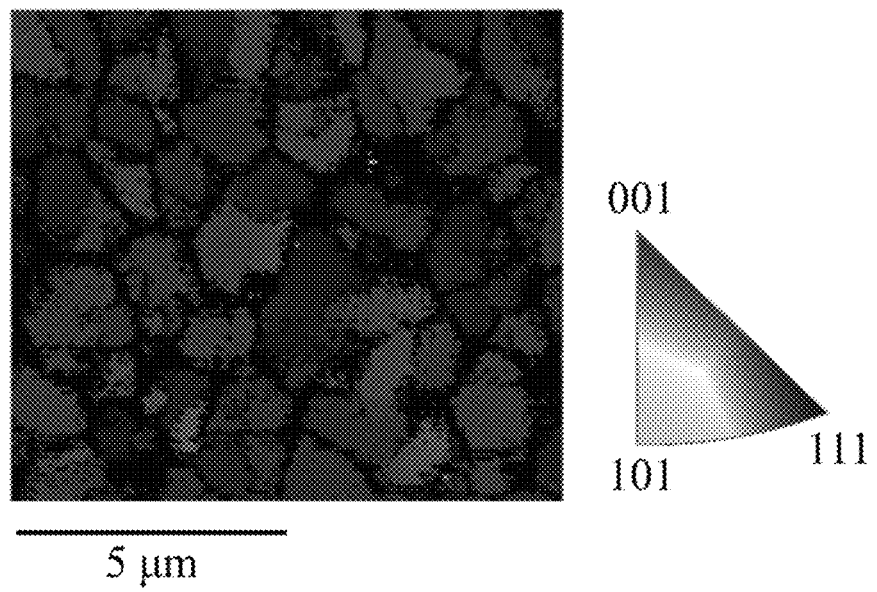
FIG. 1 is an EBSD photo of a nano-twinned Cu specimen according to Comparative example 1 of the present disclosure.

Different embodiments of the present disclosure are provided in the following description. These embodiments are meant to explain the technical content of the present disclosure, but not meant to limit the scope of the present disclosure. A feature described in an embodiment may be applied to other embodiments by suitable modification, substitution, combination, or separation.

It should be noted that, in the present specification, when a component is described to have an element, it means that the component may have one or more of the elements, and it does not mean that the component has only one of the element, except otherwise specified.

In the present specification, except otherwise specified, the feature A "or" or "and/or" the feature B means the existence of the feature A, the existence of the feature B, or the existence of both the features A and B. The feature A "and" the feature B means the existence of both the features A and B. The term "comprise(s)", "comprising", "include(s)", "including", "have", "has" and "having" means "comprise(s)/comprising but is/are/being not limited to".

Moreover, in the present specification, when an element is described to be arranged "on" another element, it does not essentially means that the elements contact the other element, except otherwise specified. Such interpretation is applied to other cases similar to the case of "on".

Moreover, in the present specification, a value may be interpreted to cover a range within ±10% of the value, and in particular, a range within ±5% of the value, except otherwise specified; a range may be interpreted to be composed of a plurality of subranges defined by a smaller endpoint, a smaller quartile, a median, a greater quartile, and a greater endpoint, except otherwise specified.

Example 1—Nano-Twinned Cu—Ni Alloy Specimen

In the present example, a 12-inch silicon wafer coated with 100 nm Ti/200 nm Cu was broken into 2 cm×3 cm specimens as a cathode. The specimen was washed with citric acid to remove oxides, and the electrodeposition region was defined with the acid alkaline resistant tape. The area of the total electrodeposition region was 2 cm×2 cm.

The plating solution used in the present example was formulated by $CuSO_4 \cdot 5H_2O$. The addition amount of $CuSO_4 \cdot 5H_2O$ powders was 196.54 g (50 g/L of Cu ion). Then, 4.5 ml of additive was added, 100 g of $H_2SO_4$ (96%) was added, and 0.1 ml of HCl (12N) was added into the plating solution. The plating solution was stirred with a stir bar until $CuSO_4 \cdot 5H_2O$ was mixed well in the plating solution (1 L). The obtained plating solution was divided into two tanks, one of which was added with 10 ml of $NiSO_4$ (0.1M) as the plating solution of the present example, and the other one without $NiSO_4$ was used as the plating solution of the comparative example. The stir bar at the bottom of the electroplating tank was rotated at 1200 rpm per minute to maintain the uniform ion concentration. The electrodeposition was performed at room temperature, 1 atm. The HCl added in the plating solution can dissolve the copper target (as an anode) in the electroplating tank normally to balance the copper ion concentration in the plating solution. Herein, the power supply (Keithley 2400) was controlled by the computer, and the electrodeposition was performed with the direct current electrodeposition. After the electrodeposition was performed under the current density of 6 ASD ($A/dm^2$) for 20 minutes, a nano-twinned Cu—Ni alloy layer with a thickness of 20 μm was obtained. In other embodiments of the present disclosure, a nano-twinned Cu—Ni alloy layer with a desired thickness may be obtained by controlling the current density during the electrodeposition.

Then, the obtained specimen was polished by electropolishing, wherein the solution for the electropolishing comprised 100 ml of $H_3PO_4$, 1 ml of acetic acid and 1 ml of glycerol. The specimen to be polished was placed onto the anode, and the electropolishing was performed under 1.75 V for 10 minutes. The specimen after electropolishing has a thickness of about 19 μm. The electropolishing process can not only level the surface of the nano-twinned Cu—Ni alloy specimen, but also make the subsequent hardness test results more accurate.

Comparative Example 1—Nano-Twinned Cu Specimen

The method for preparing the nano-twinned Cu specimen of the present comparative example is similar to that for preparing the nano-twinned Cu—Ni alloy specimen of Example 1, except that the plating solution without $NiSO_4$ as illustrated in Example 1 was used in electrodeposition of the present comparative example.

The surface preferred direction and the micro-structure of the specimens after electropolishing of Example 1 and Comparative example 1 was analyzed with electron backscatter diffraction (EBSD) and focus ion beam (FIB).

Figure 2:
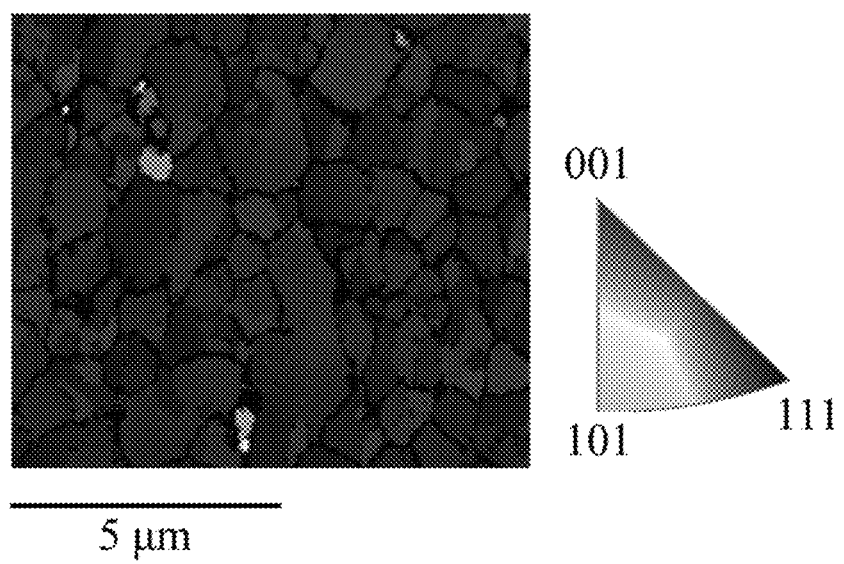
FIG. 2 is an EBSD photo of a nano-twinned Cu—Ni alloy specimen according to Example 1 of the present disclosure.
Figure 3:
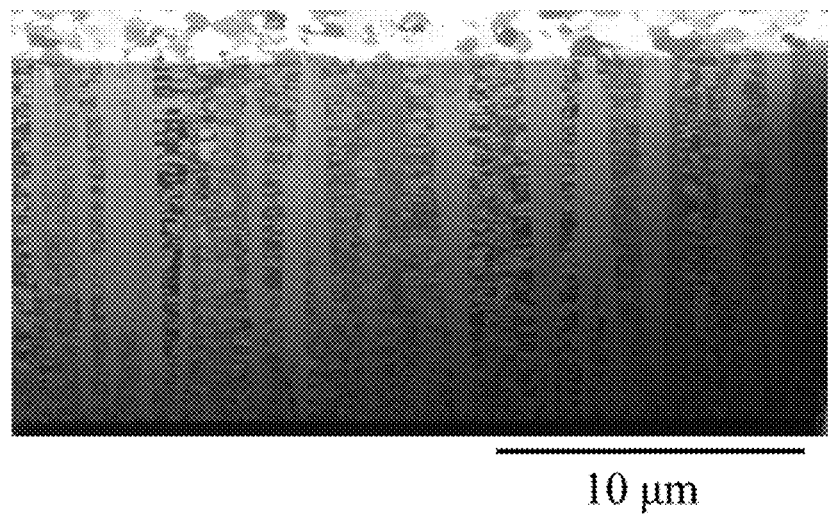
FIG. 3 is a FIB photo of a nano-twinned Cu—Ni alloy specimen according to Example 1 of the present disclosure.

FIG. 1 and FIG. 2 are respectively EBSD photos of the nano-twinned Cu specimen according to Comparative example 1 and the nano-twinned Cu—Ni alloy specimen according to Example 1 of the present disclosure. FIG. 3 is a FIB photo of a nano-twinned Cu—Ni alloy specimen according to Example 1 of the present disclosure.

As shown in FIG. 1 and FIG. 2, the results obtained by the EBSD measurement show that almost all the volume (more than 95% in volume) of the nano-twinned Cu specimen of Comparative example 1 and the nano-twinned Cu—Ni alloy specimen of Example 1 comprises columnar twinned grains connected to each other, and the diameter of the columnar twinned grains are in a range about 0.5 μm to about 3 μm. In addition, the twinned grains are formed by stacking nano-twins along the [111] crystal axis, and the grain boundary of the nano-twins is substantially parallel to the surface of the cathode (i.e. the lamination direction of the nano-twins is substantially parallel to the thickness direction of the specimen). Thus, almost all the surface of the specimen (95% or more of the area) exposes the (111) surface of the nano-twins, which indicates that the nano-twinned Cu specimen of Comparative example 1 and the nano-twinned Cu—Ni alloy specimen of Example 1 have the (111) preferred direction.

As shown in FIG. 3, the results obtained by the FIB measurement show that most of the grains in the nano-twinned Cu—Ni alloy specimen of Example 1 have twinned grains with high density. More than 95% in volume of the nano-twinned Cu—Ni alloy specimen comprises twinned grains. The included angle between the twin direction of more than 95% of the twinned grains and the thickness direction of the nano-twinned Cu—Ni alloy specimen is about 0 degree, and the included angle between the twin direction of more than 95% of the twinned grains and the surface of the substrate is about 90 degrees; which means that the twin boundary of the twinned grains are substantially parallel to the surface of the substrate. In addition, more than 95% of the twinned grains in the nano-twinned Cu—Ni alloy specimen have the thickness ranging from about 1 μm to about 20 μm.

Hardness Test

The specimens of Example 1 and Comparative example 1 obtained after electropolishing were cleaned with citric acid solution, and the water droplets on the surface of the specimens were removed with a nitrogen spray gun. Then, the nano-twinned Cu specimen of Comparative example 1 and the nano-twinned Cu—Ni alloy specimen of Example 1 were respectively annealed in the furnace tube. The pressure of the vacuum environment was $10^{-3}$ torr, the annealing temperature was 100° C., 150° C. and 200° C. respectively, and the annealing time was 1 hour and 5 hours. The specimens of Example 1 and Comparative example 1 before and after annealing were tested by Vickers hardness machine. The Vickers hardness machine punches a diamond-shaped hole on the specimen, and the hardness of the specimens before and after annealing was obtained after computer calculation.

Figure 4:
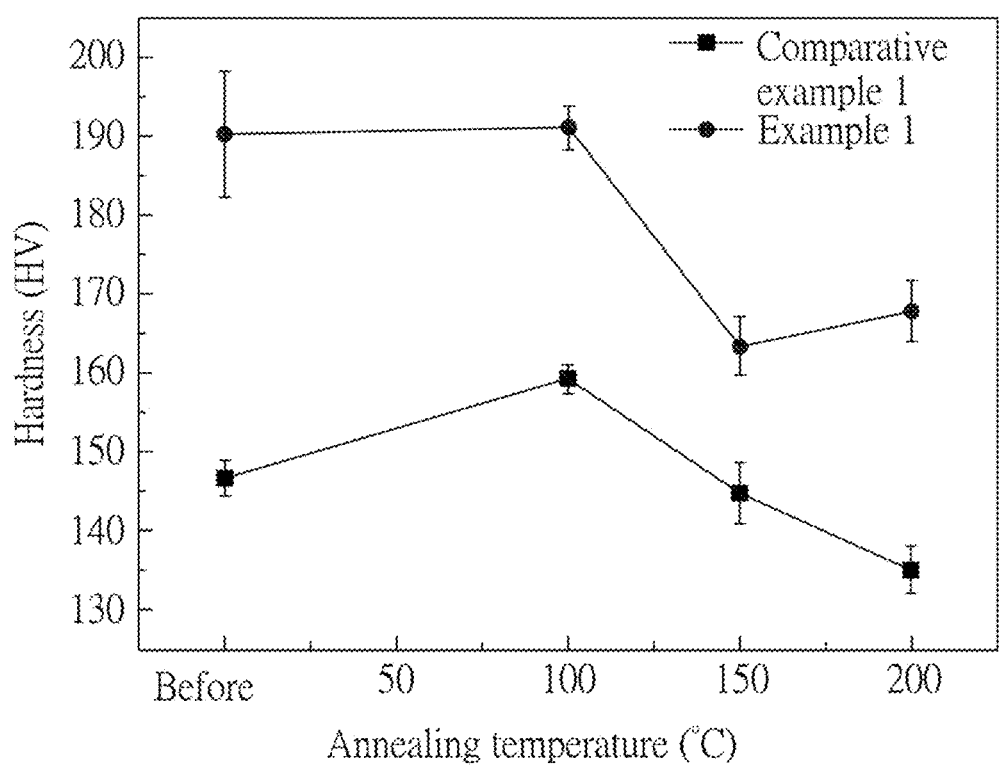
FIG. 4 is a comparison diagram of hardness of the specimens according to Example 1 and Comparative Example 1 of the present disclosure before and after annealing at different temperatures for 1 hour.

FIG. 4 is a comparison diagram of hardness of the specimens according to Example 1 and Comparative example 1 of the present disclosure before and after annealing at different temperatures for 1 hour. The following table 1 shows the comparison result of the total strengthening degree of the specimens of Example 1 and Comparative example 1 of the present disclosure, wherein the comparison object of the total strengthening degree is the hardness of the specimen of Comparative example 1 before annealing, as indicated by the rectangle in FIG. 4.

TABLE 1

| Annealing temperature/Time | Total strengthening degree (%) |
|---|---|
| Room temperature (before annealing) | 29.74 |
| 100° C./1 hour | 30.28 |
| 150° C./1 hour | 11.45 |
| 200° C./1 hour | 14.46 |

As shown in FIG. 4 and Table 1, before annealing, the hardness of the nano-twinned Cu—Ni alloy specimen of Example 1 is greater than the nano-twinned Cu specimen of Comparative example 1, and this result indicates that the hardness of the nano-twinned Cu specimen can be increased by adding suitable amount of nickel. In addition, the nano-twinned Cu—Ni alloy specimen of Example 1 after annealing at 100° C. for 1 hour has a hardness of 191 HV. Compared with the nano-twinned Cu specimen of Comparative example 1 before annealing, the hardness of the nano-twinned Cu—Ni alloy specimen of Example 1 can be increased by 30.28%. This result indicates that the hardness of the nano-twinned Cu—Ni alloy specimen of Example 1 can further be improved by annealing at low temperature.

Figure 5:
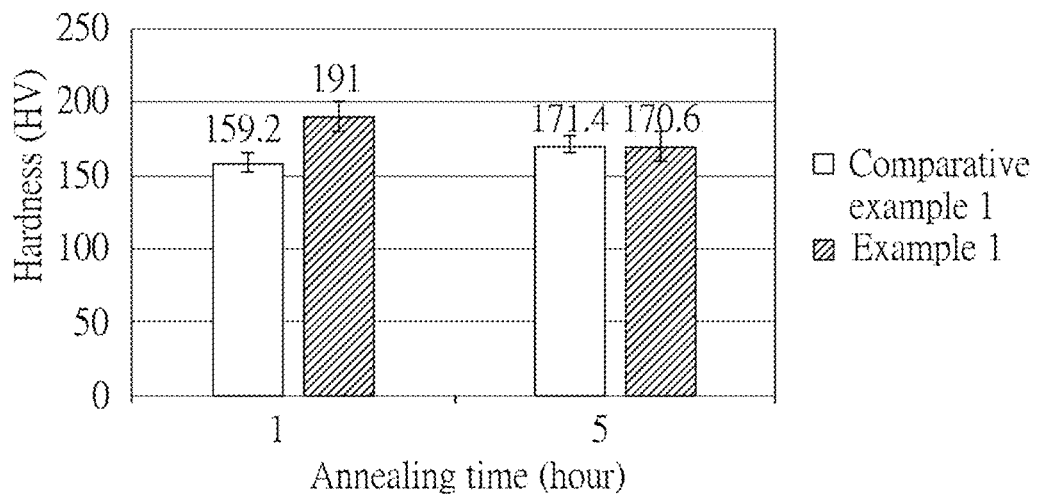
FIG. 5 is a comparison diagram of hardness of the specimens according to Example 1 and Comparative Example 1 of the present disclosure after annealing at 100° C. for 1 hour and 5 hours.
Figure 6:
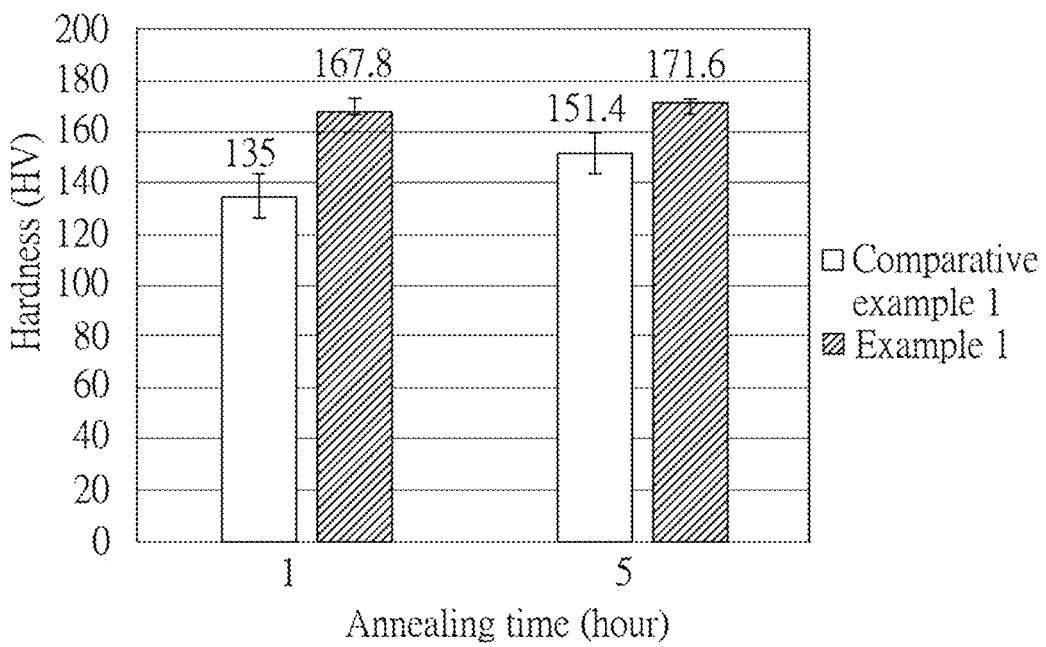
FIG. 6 is a comparison diagram of hardness of the specimens according to Example 1 and Comparative Example 1 of the present disclosure after annealing at 200° C. for 1 hour and 5 hours.

FIG. 5 and FIG. 6 are respectively comparison diagrams of hardness of the specimens according to Example 1 and Comparative Example 1 of the present disclosure after annealing at 100° C. and 200° C. for 1 hour and 5 hours. The result shows that the hardness of the nano-twinned Cu—Ni alloy specimen of Example 1 is not decreased significantly even after long-term annealing, indicating that the nano-twinned Cu—Ni alloy specimen of Example 1 has good thermal stability.

Example 2—Nano-Twinned Cu—Ni Alloy Specimen

The method for preparing the nano-twinned Cu—Ni alloy specimen of the present example is similar to that for preparing the nano-twinned Cu—Ni alloy specimen of Example 1, except that the electrodeposition process used in the present example was the pulse electrodeposition. The forward current density was 8 ASD, the reverse current density was 0.7 ASD, the plating time was about 24 minutes, and the thickness of the obtained specimen was about 23 μm. After the specimen was polished by electropolishing as described in Example 1, the specimen after electropolishing has a thickness of about 22 μm.

Comparative Example 2—Nano-Twinned Cu Specimen

The method for preparing the nano-twinned Cu specimen of the present comparative example is similar to that for preparing the nano-twinned Cu—Ni alloy specimen of Example 2, except that the plating solution without $NiSO_4$ was used in electrodeposition of the present comparative example.

The surface preferred direction and the micro-structure of the specimens after electropolishing of Example 2 and Comparative example 2 was analyzed with EBSD and FIB.

Figure 7:
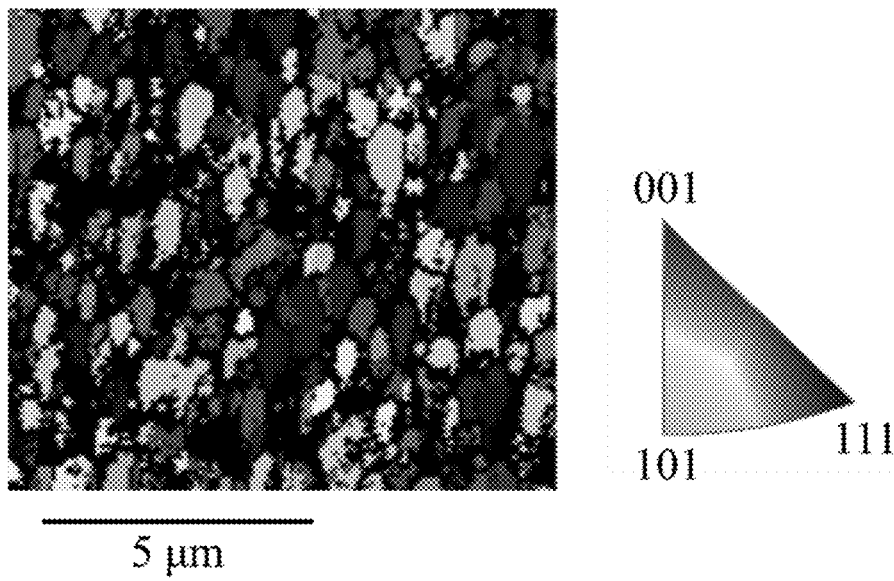
FIG. 7 is an EBSD photo of a nano-twinned Cu specimen according to Comparative example 2 of the present disclosure.
Figure 8:
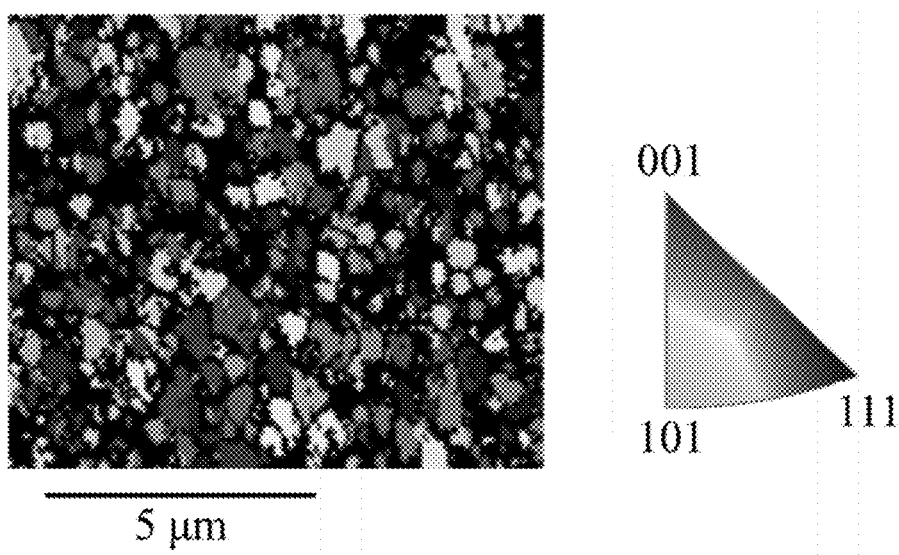
FIG. 8 is an EBSD photo of a nano-twinned Cu—Ni alloy specimen according to Example 2 of the present disclosure.
Figure 9:
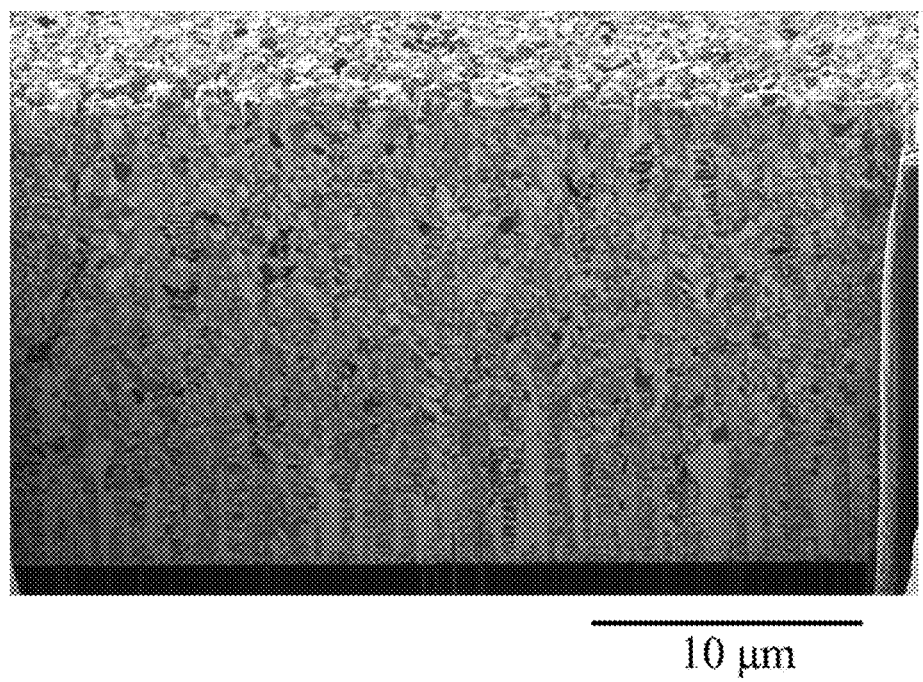
FIG. 9 is a FIB photo of a nano-twinned Cu—Ni alloy specimen according to Example 2 of the present disclosure.

FIG. 7 and FIG. 8 are respectively EBSD photos of the nano-twinned Cu specimen according to Comparative example 2 and the nano-twinned Cu—Ni alloy specimen according to Example 2 of the present disclosure. FIG. 9 is a FIB photo of a nano-twinned Cu—Ni alloy specimen according to Example 2 of the present disclosure.

As shown in FIG. 9, within a range of about 5 μm from the surface of the substrate, the twinned grains of the nano-twinned Cu—Ni alloy specimen of Example 2 comprise columnar twinned grains. Outside the range of about 5 μm from the surface of the substrate, the twinned grains of the nano-twinned Cu—Ni alloy specimen of Example 2 further comprise oblique twinned grains and fine grains stacked on the plural columnar twinned grains. The included angle between the stacking direction of the nano-twins of the oblique twinned grains and the thickness direction of the specimen is ranged from 10 degrees to 60 degrees. The stacking direction of the nano-twins of the fine grains does not have a preferred direction. This result verifies the reason why the specimens shown in EBSD photos of FIG. 7 and FIG. 8 do not have a preferred direction.

Figure 10:
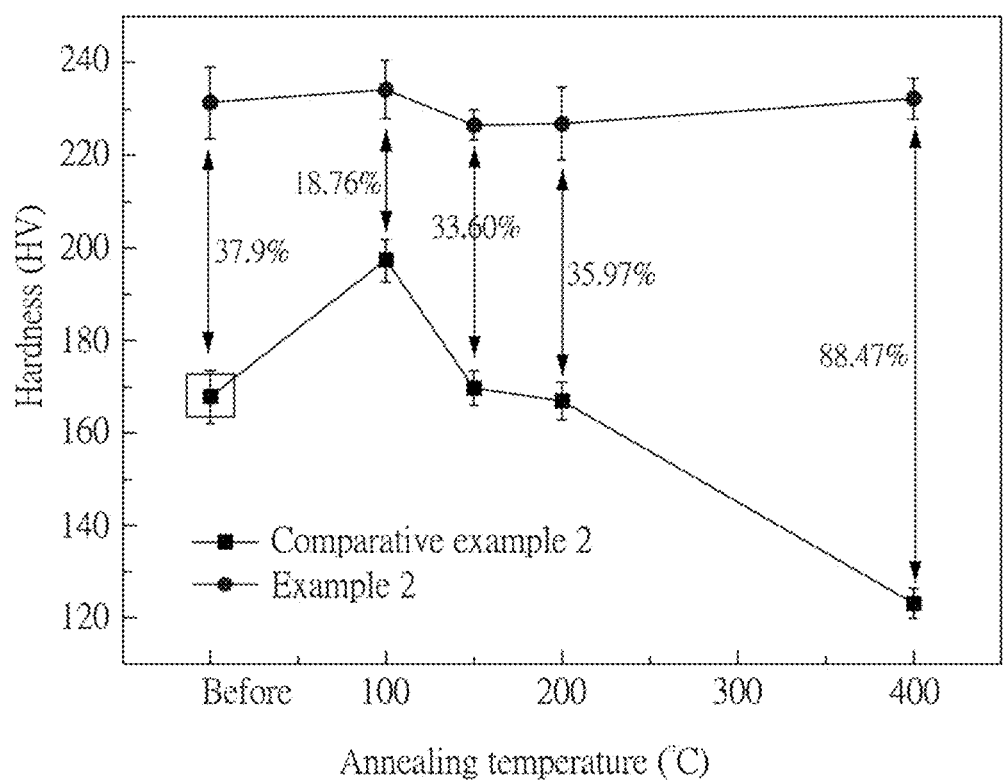
FIG. 10 is a comparison diagram of hardness of the specimens according to Example 2 and Comparative Example 2 of the present disclosure before and after annealing at different temperatures for 1 hour.

The hardness of the specimens of Example 2 and Comparative example 2 obtained after electropolishing was tested by the same method described above. FIG. 10 is a comparison diagram of hardness of the specimens according to Example 2 and Comparative example 2 of the present disclosure before and after annealing at different temperatures for 1 hour. The following table 2 shows the comparison result of the total strengthening degree of the specimens of Example 2 and Comparative example 2 of the present disclosure, wherein the comparison object of the total strengthening degree is the hardness of the specimen of Comparative example 2 before annealing, as indicated by the rectangle in FIG. 10.

TABLE 2

| Annealing temperature/Time | Total strengthening degree (%) |
| --- | --- |
| Room temperature (before annealing) | 37.90 |
| 100° C./1 hour | 39.57 |
| 150° C./1 hour | 35.04 |
| 200° C./1 hour | 35.16 |

As shown in FIG. 10 and Table 2, before annealing, the hardness of the nano-twinned Cu—Ni alloy specimen of Example 2 is greater than the nano-twinned Cu specimen of Comparative example 2, and this result indicates that the hardness of the nano-twinned Cu specimen can be increased by adding suitable amount of nickel. In addition, the nano-twinned Cu—Ni alloy specimen of Example 2 after annealing at 100° C. for 1 hour has a hardness of 234.2 HV. Compared with the nano-twinned Cu specimen of Comparative example 2 before annealing, the hardness of the nano-twinned Cu—Ni alloy specimen of Example 2 can be increased by 39.57%. This result indicates that the hardness of the nano-twinned Cu—Ni alloy specimen of Example 2 can further be improved by annealing at low temperature.

Figure 11:
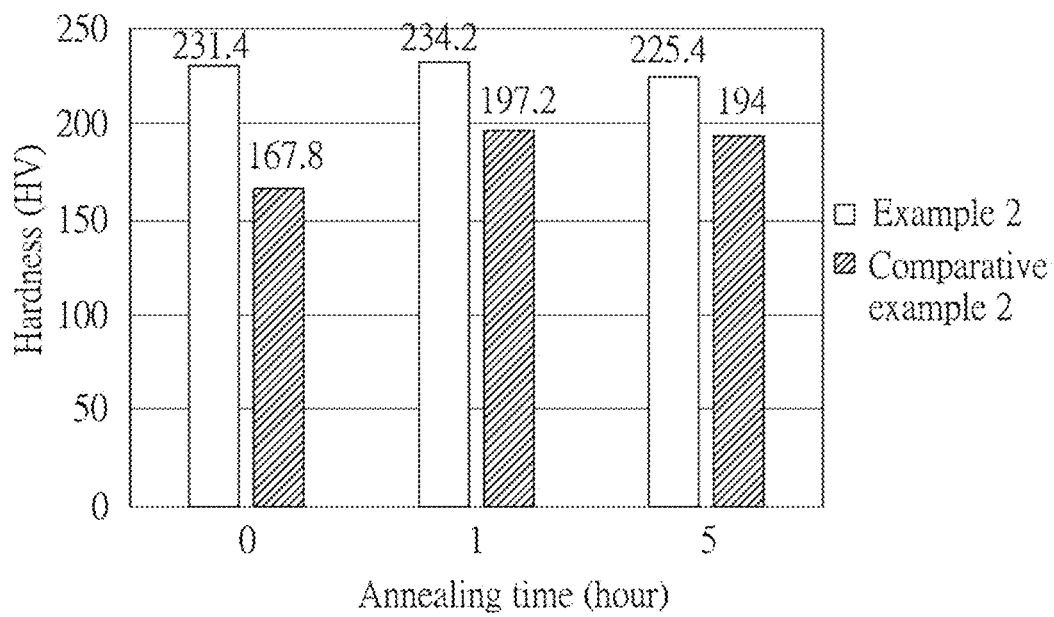
FIG. 11 is a comparison diagram of hardness of the specimens according to Example 2 and Comparative Example 2 of the present disclosure after annealing at 100° C. for 1 hour and 5 hours.
Figure 12:
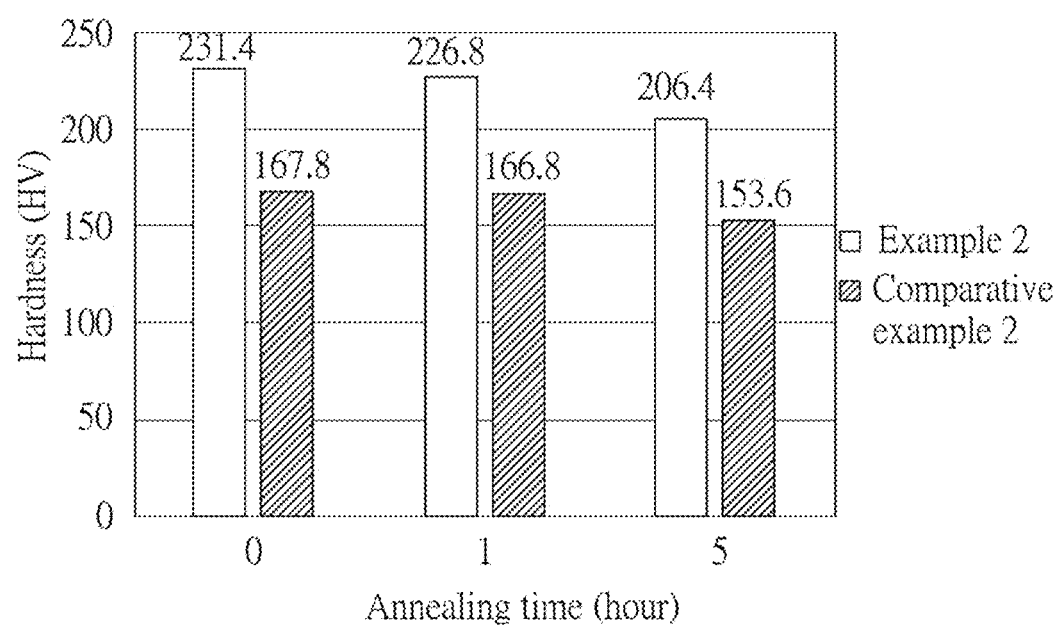
FIG. 12 is a comparison diagram of hardness of the specimens according to Example 2 and Comparative Example 2 of the present disclosure after annealing at 200° C. for 1 hour and 5 hours.

FIG. 11 and FIG. 12 are respectively comparison diagrams of hardness of the specimens according to Example 2 and Comparative Example 2 of the present disclosure after annealing at 100° C. and 200° C. for 1 hour and 5 hours. The result shows that the hardness of the nano-twinned Cu—Ni alloy specimen of Example 2 is not decreased significantly even after long-term annealing, indicating that the nano-twinned Cu—Ni alloy specimen of Example 2 has good thermal stability.

Resistivity Test

The resistivity of the specimens of Example 2 and Comparative example 2 obtained after electropolishing was tested. Herein, after the four-point measurement, the resistivity of the specimen is converted by the following equation (I).

$$\rho = Rs \times T = [C.F. \times (V/I)] \times T \quad (I)$$

Herein, ρ is the resistivity of the specimen (μΩ-cm); Rs is the sheet resistance (Ω); T is the thickness of the specimen (cm); C.F. is the correction factor; V is the DC voltage passing the voltage probe; and I is the fixed DC current passing the current probe.

The result shows that the resistivity of the nano-twinned Cu specimen without nickel of Comparative example 2 is about 2.18μΩ-cm, and the resistivity of the nano-twinned Cu—Ni alloy specimen of Example 2 is about 2.07 μΩ-cm to 3.44μΩ-cm. This result indicates that, by adding suitable amount of nickel, not only the hardness of the nano-twinned Cu can be increased, but also the characteristics of high conductivity and low resistance of the nano-twinned Cu can be maintained.

In conclusion, the nano-twinned Cu—Ni alloy with preferred orientation of lattice directions (as shown in Example 1) and with random orientation of lattice directions (as shown in Example 2) can be easily obtained by co-electroplating; and then the annealing process is optionally performed. In the present disclosure, the hardness of the nano-twinned Cu—Ni alloy specimen with the strong <111> preferred orientation is significantly greater than the hardness of the nano-twinned Cu layer without nickel having the <111> preferred orientation. In the present disclosure, the nano-twinned Cu—Ni alloy specimen with high hardness can also be obtained by the pulse electrodeposition (as shown in Example 2), and the hardness of the specimen can be increased without additional hardening process.

Figure 13:
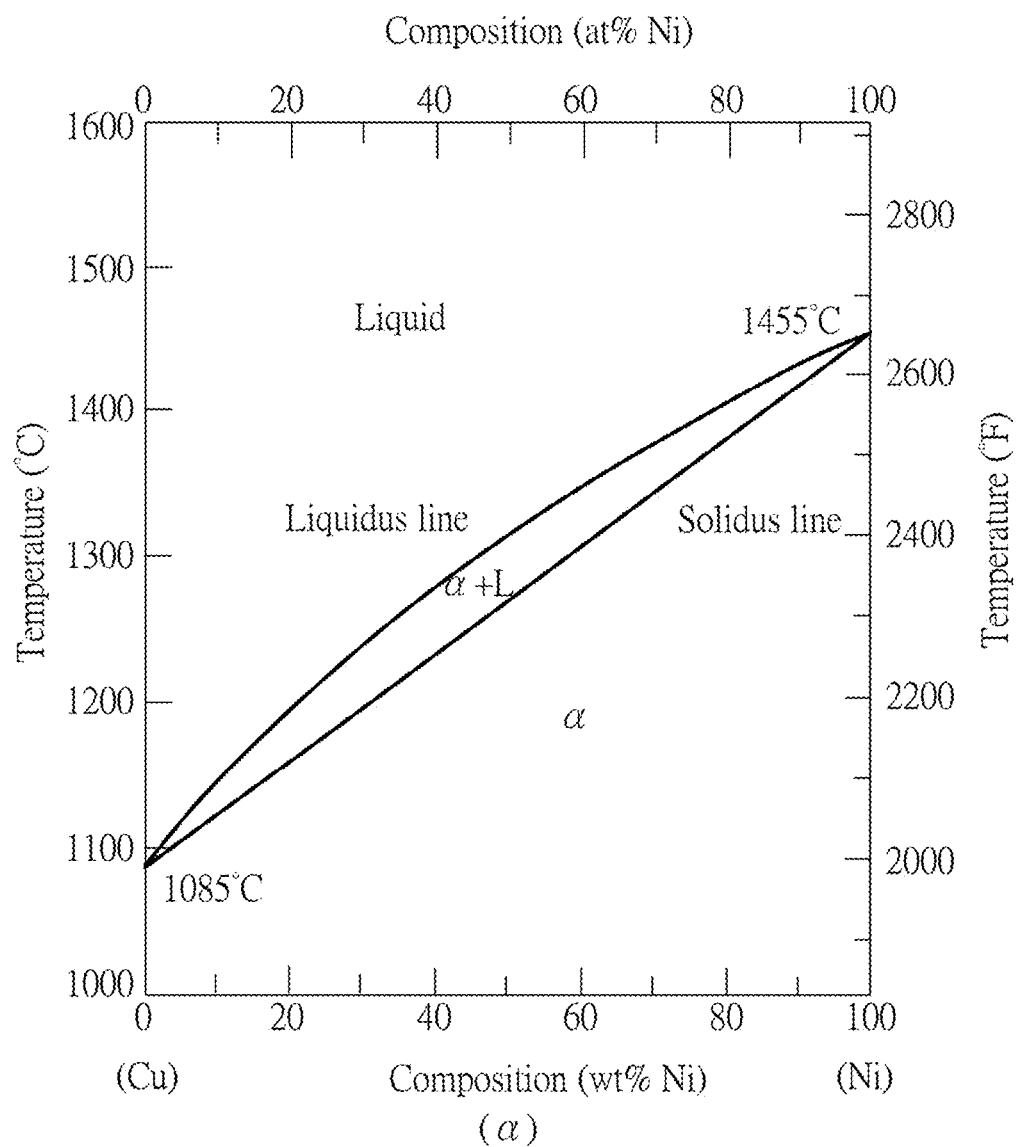
FIG. 13 is a phase diagram of a Cu-Nu alloy.

Nano-twinned Cu with preferred orientation has good lattice direction, and the strength itself is better than Cu bulk. Since nano-twinned Cu already has high strength, it is not easy to increase its strength. Thus, in the present disclosure, the hardness of the nano-twinned Cu—Ni alloy specimen can further be improved by short time, low temperature, rapid annealing. In addition, nickel is a high-strength metal among metals. From the phase diagram (as shown in FIG. 13), the Cu—Ni alloy of the present disclosure are fusible and no eutectoids is produced. Furthermore, the amount of nickel added in the nano-twinned Cu—Ni alloy specimen is not much, so the probability of electromigration effect can be reduced, the electrical properties of the component are not affected, and the reliability of the component can be effectively improved. In particular, in the nano-twinned Cu—Ni alloy specimen of the present disclosure, the resistivity of the specimen is not significantly improved after adding nickel, and the specimen still has high conductivity. Thus, the nano-twinned Cu—Ni alloy specimen of the present disclosure has high strength, high electrical conductivity and high thermal conductivity and can be applied to various electronic components.

Although the present disclosure has been explained in relation to its embodiment, it is to be understood that many other possible modifications and variations can be made without departing from the spirit and scope of the disclosure as hereinafter claimed.

What is claimed is:

1. A nano-twinned Cu—Ni alloy layer, wherein more than 50% in volume of the nano-twinned Cu—Ni alloy layer comprises plural twinned grains, the plural twinned grains comprise plural columnar twinned grains, and a Ni content in the nano-twinned Cu—Ni alloy layer is in a range from 0.1 at % to 15 at %;
    wherein the plural twinned grains further comprise plural oblique twinned grains stacked on the plural columnar twinned grains;
    wherein the plural oblique twinned grains are formed by stacking plural nano-twins along a direction within ±15 degrees of a [111] crystal axis, and an included angle between a stacking direction of at least part of the plural nano-twins of the plural oblique twinned grains and a thickness direction of the nano-twinned Cu—Ni alloy layer is ranged from 10 degrees to 60 degrees.

2. The nano-twinned Cu—Ni alloy layer of claim 1, wherein the plural columnar twinned grains are formed by stacking the plural nano-twins along the direction within ±15 degrees of the [111] crystal axis.

3. The nano-twinned Cu—Ni alloy layer of claim 1, wherein the plural columnar twinned grains are formed by stacking plural nano-twins along the direction within ±15 degrees of the [111] crystal axis, and an included angle between a stacking direction of at least part of the plural nano-twins of the plural columnar twinned grains and the thickness direction of the nano-twinned Cu—Ni alloy layer is ranged from 0 degree to 20 degrees.

4. The nano-twinned Cu—Ni alloy layer of claim 3, wherein 50% or more of an area of a surface of the nano-twinned Cu—Ni alloy layer exposes a (111) surface of the nano-twins.

5. The nano-twinned Cu—Ni alloy layer of claim 1, wherein the plural twinned grains further comprises plural fine grains stacked on the plural columnar twinned grains, and nano-twins of the plural fine grains are stacked without a preferred direction.

6. The nano-twinned Cu—Ni alloy layer of claim 5, wherein a surface of the nano-twinned Cu—Ni alloy layer is not a preferred surface.

7. The nano-twinned Cu—Ni alloy layer of claim 1, wherein a surface of the nano-twinned Cu—Ni alloy layer is not a preferred surface.

8. The nano-twinned Cu—Ni alloy layer of claim 1, wherein diameters of the plural columnar twinned grains are respectively in a range from 0.1 μm to 50 μm.

9. The nano-twinned Cu—Ni alloy layer of claim 1, wherein thicknesses of the plural columnar twinned grains are respectively in a range from 0.1 μm to 500 μm.

10. The nano-twinned Cu—Ni alloy layer of claim 1, wherein at least part of the plural columnar twinned grains are connected to each other.

11. A method for manufacturing a nano-twinned Cu—Ni alloy layer, comprising the following steps:
    providing an electrodeposition device, comprising an anode, a cathode, a plating solution and a power supply, wherein the power supply is respectively connected to the cathode and the anode, and the cathode and the anode are immersed into the plating solution; and
    performing an electrodeposition process with the electrodeposition device to grow a nano-twinned Cu—Ni alloy layer on a surface of the cathode,
    wherein more than 50% in volume of the nano-twinned Cu—Ni alloy layer comprises plural twinned grains, the plural twinned grains comprise plural columnar twinned grains, and a Ni content in the nano-twinned Cu—Ni alloy layer is in a range from 0.1 at % to 15 at %;
    wherein the plural twinned grains further comprise plural oblique twinned grains stacked on the plural columnar twinned grains;
    wherein the plural oblique twinned grains are formed by stacking plural nano-twins along a direction within ±15 degrees of a [111] crystal axis, and an included angle between a stacking direction of at least part of the plural nano-twins of the plural oblique twinned grains and a thickness direction of the nano-twinned Cu—Ni alloy layer is ranged from 10 degrees to 60 degrees, and
    wherein the plating solution comprises a Cu salt, an acid and a Ni salt.

12. The method of claim 11, further comprising a step of: annealing the nano-twinned Cu—Ni alloy layer after growing the nano-twinned Cu—Ni alloy layer on the surface of the cathode.

13. The method of claim 12, wherein a temperature for annealing the nano-twinned Cu—Ni alloy layer is in a range from 50° C. to 250° C.

14. The method of claim 11, wherein the electrodeposition process is a direct current electrodeposition.

15. The method of claim 11, wherein the electrodeposition process is a pulse electrodeposition.

16. The method of claim 15, wherein the plural twinned grains further comprises plural fine grains stacked on the plural columnar twinned grains, and nano-twins of the plural fine grains are stacked without a preferred direction.

* * * * *